US008190468B1

(12) United States Patent
Drew et al.

(10) Patent No.: US 8,190,468 B1
(45) Date of Patent: May 29, 2012

(54) PERSONNEL PRODUCTIVITY INDICES

(75) Inventors: James Howard Drew, Boxborough, MA (US); Hui Liu, Lexington, MA (US)

(73) Assignee: Verizon Laboratories Inc., Waltham, MA (US)

(*) Notice: Subject to any disclaimer, the term of this patent is extended or adjusted under 35 U.S.C. 154(b) by 3224 days.

(21) Appl. No.: 10/699,141

(22) Filed: Oct. 31, 2003

(51) Int. Cl.
*G06Q 10/00* (2012.01)
(52) U.S. Cl. ..................................... 705/7.42
(58) Field of Classification Search .................... 705/11, 705/7.42
See application file for complete search history.

(56) References Cited

OTHER PUBLICATIONS

Roth, Philip; Bobko, Philip; "A Research Agenda for Multi-Attribute Utility Analysis in Human Resource Management", 1997, Human Resource Management Review, vol. 7, No. 3, pp. 341-368.*
Edwards, Jeffrey R; Parry, Mark E; "On the Use of Polynomial Regression as an alternative to Difference Scores in Organizational Research", Dec. 1993, The Academy of Management Journal, vol. 36, No. 6, pp. 1577-1613.*
Trocine, Linda; Malone, Linda; "Finding Important Independent Variables Through Screening Designs: A comparison of methods", 2000, Proceedings of the 2000 Winter Simulation Conference, pp. 749-754.*
Jacobson, Tom; "Reaching New Heights", Jun. 1999, Credit Union Management, Madison, vol. 22, Iss. 6, p. 50, 4 pgs.*
Yoo, Tae-Young; Muchinsky, Paul M; "Utility Estimates of Job Performance as Related to Data, People and Things Parameters of Work", Jul. 1998, Journal of Organizational Behavior, vol. 19, No. 4, pp. 353-370.*
Roth et al. "Estimating the impact of variable costs on SDy in Complex Situations", 1994, Journal of Business and Psychology, vol. 8, No. 4, pp. 1-18.*
Boudreau, John; "Utility Analysis: A new perspective on Human Resource Decision Making", 1987, Cornell University, pp. 1-79.*
Hunter, John, et al. "Individual Differences in Output Variability as a function of Job Complexity", Abstract, 1990, Journal of Applied Psychology, vol. 75(1), pp. 28-42.*
Becker, Brian E; Huselid, John; "Direct Estimates of SDy and the implications for Utility Analysis", 1992, Journal of Applied Psychology, vol. 77, No. 3, pp. 227-233.*
Boudreau, John; "Future Utility Analysis Research: Continue but Expand the Cognitive and Strategic Focus", 1995, Cornell University, pp. 1-27.*
Boudreau, John; Gerhart, Barry; "Voluntary Turnover and Job Performance: Curvilinearity and the Moderating Influences of Salary Growth, Promotions and Labor Demand", 1995, Cornell University, pp. 1-59.*
Clyde, Merlise; Chaloner, Kathryn; "The Equivalence of Constrained and Weighted Designs in Multiple Design Objective Problems", 1996, retrieved from the web at http://citeseer.ist.psu.edu/83991.html.*
Holling, Heinz; "Utility Analysis of Personnel Selection—An Overview and Empirical Study Based on Objective Performance Measures", 1998, Methods of Psychological Research Online, vol. 3, No. 1, pp. 1-20.*
Cabrera, Elizabeth; Raju, Nambury S; "Utility Analysis: Current Trends and Future Directions", Abstract, 2001, International Journal of Selection and Assessment, vol. 9, No. 1-2, pp. 92-102.*
Judiesch, Michael K; "Using Estimates of the Output Productivity Ratio (SDp) to Improve the accuracy and Managerial Acceptance of Utility Analysis Acceptance", Winter 2001, Journal of Business and Psychology, vol. 16, No. 2, pp. 1-12.*

(Continued)

*Primary Examiner* — Jonathan G Sterrett

(57) ABSTRACT

Disclosed are methods and systems that can develop productivity scores for quantitatively comparing employees with somewhat different job task assignments. Evaluations of modeled task performance scores can be obtained and analysis of the evaluations, e.g., a regression analysis, can be performed to obtain performance parameters. The performance parameters can be applied to employee task performance scores over a time frame to obtain productivity scores for the employees. Statistical control charts based on the productivity scores can be used to identify outstanding and/or poorly performing employees.

32 Claims, 4 Drawing Sheets

OTHER PUBLICATIONS

Arvey RD; Murphy KR; "Performance Evaluation in Work Settings", 1998, Annual Review of Psychology, 49, pp. 141-168 (Abstract).*
Boudreau, John; Ramstad, Peter M; "Strategic I/O Psychology and Utility Analysis", 2001, Cornell University, pp. 1-44.*
Landy, et al. "The Bottom Line in Performance Evaluation", 1982, Public Productivity Review, vol. 6, No. ½, pp. 78-92 (Abstract).*
Syllabus for MSC Program, University of Surrey (UK), Department of Psychology, Spring 2002, pp. 1-46.*
Roth et al. "Multi-Attribute Utility Analysis Using the PROMES Approach", 1994, Journal of Business and Psychology, vol. 9, No. 1, pp. 1-12.*

* cited by examiner

PERSONNEL PRODUCTIVITY INDICES

FIELD

The systems and methods relate to performance measurement, and more particularly to productivity indices or metrics for comparing employees performing differing tasks.

BACKGROUND

Common practices in today's business world can include job performance measurement. Such measurements have long been a construct of critical concern for both administrative practice and theory testing, motivating the development of quantitative productivity measures. Job performance measurement, using quantifiable criteria, can serve crucial business needs. Practitioners and researchers in the field indicate that the job performance measuring process can commonly serve two basic purposes (McGregor, "An Uneasy Look at Performance Appraisal", Harvard Business Review, 35, 89-94 (1957); Meyer, Kay and French, "Split Roles in Performance Appraisal", *Harvard Business Review*, 43, 123-129 (1965); and Wexley, "Roles of Performance Appraisal in Organizations", In Kerr S. (Ed.), *Organizational Behavior*, pp 241-259, Columbus, Ohio: Grid Publishing Co. (1979)).

First, performance measures can serve administrative purposes by providing a basis for determining compensation, salary increases, promotions, terminations, and many other administrative decisions. Podsakoff, Tudor and Skov, "Effects of Leader Contingent and Non-Contingent Reward and Punishment Behaviors on Subordinate Performance and Satisfaction", *Academy of Management Journal*, 25, 810-821 (1982) showed that when supervisors establish reward contingencies for job performance, employees exhibit greater job satisfaction, motivation and commitment, and this is known to increase performance. Second, job performance measures can serve developmental purposes by helping to determine how and when to provide employees with specific job feedback, assistance and counseling to improve their future job performance. For both purposes, the company can benefit through increased employee productivity.

Understandably, conclusions about the determinants of job performance and about the decision quality based on performance measures can depend heavily upon the reliability of the performance measures used, which in turn can depend on the amount of error in obtaining the performance ratings. Rater bias can be one source of error variance. Other sources of error variance can include differences in the reliability of ratings between studies, differences in range restriction between studies, and sampling error, as summarized in the literature (Schmidt and Hunter, "Development of a General Solution to the Problem of Validity Generalization", *Journal of Applied Psychology*, 62, 529-540 (1977)). A well-designed rating methodology can seek to minimize, or at the least, to estimate these quantities.

Once the components of performance have been determined, remaining key technical issues can include the construction of the weighting scheme to combine the performance components to obtain an overall measurement. The weighting scheme and combination of components can provide a single measurement of employee performance for the ease of comparing employees. Furthermore, an employee's rating can often culminate in a single management decision or action, e.g., re-training the employee, rewarding the employee, or re-assigning the employee. An evaluation methodology resulting in a single primary measure of performance can improve the decision making process. Milkovich and Newman (*Compensation*. Plano, Tex.: Business Publications (1987)), and Davis and Sauser ("Effects Of Alternative Weighting Methods in a Policy-Capturing Approach to Job Evaluation: A Review and Empirical Investigation", *Personnel Psychology*, 44, 85-127 (1991)) describe basic approaches used in combining, or weighting the components of a job task to arrive at a single performance measure, including rational, equal and statistical weighting.

Rational weights can include numerical values chosen to reflect subjective judgment about how each task component should contribute to the overall evaluation. From an administrative perspective, this method can have appeal because of its flexibility. Inputs and negotiation can be obtained from different Subject Area Experts. Rational weights can also provide flexibility in selecting weights tailored to the unique jobs and technology under study. On the other hand, rational weights can be susceptible to personal biases that may invalidate the job evaluation.

One form of the rational weights approach can include assigning weights to the various components proportional to the average or ideal amount of time the employee spends on that task. It can be noted that rational weighting can fall under the heading of subjective weighting since management often presumes that the "importance" of a task component depends on the amount of time it takes to perform the task, and the task component time used in the weighting can be some idealized calculation, rather than an actual one, to guard against weighting based on inefficient or misguided employee performance. That is, it can be recognized that a lengthy task need not be necessarily important.

In an equal weighting approach, all factors can contribute to the overall evaluation with equal weight. This simple method has found application in a variety of behavioral research contexts. For example, studies in educational testing, employee selection, etc., have indicated that the equal weighting approach can sometimes exceed the predictive validity given by differential weighting models, including multiple regression. However, the use of equal weights with job evaluation factors appears to be a rare occurrence.

In a statistical weighting approach, a statistical method, e.g., regression, can be used to estimate weights from a data set. Many statistical approaches can be used in deriving the weights, with ordinary least squares (OLS) weighting being the most often used. However, control of sampling error can potentially cause problems with OLS weighting. This can be the case when only naturally occurring task measures and evaluations are used in the calculations.

An exemplary operation of a data services center can illustrate the difficulty in determining performance measures. Technicians at such a center can perform several tasks, depending on their job assignments. The job assignments can change quite frequently, as the center managers try to match workforce to the workload. As a result, over a period of time, the technicians can work on several different job assignments, performing several tasks of various levels of difficulty. A methodology of measuring the productivity of the technicians for a certain period of time can consider the mix of job assignments such that technician productivity can be consistently compared across the data services center employees. Productivity measurements can include assignment-wise productivity measures, e.g., separate measures for separate assignments. More importantly, the productivity measurements can take into account a technician's mix of job assignments over the time period being examined.

As a further example, the basic job assignments at the center can include customer queuing and ticket pooling. Customer queuing tasks can include answering incoming calls from customers and opening trouble tickets. Ticket pooling tasks can include coordinating troubleshooting and closing the ticket once trouble has been resolved. At times when assigned workforce and workload do not match, technicians from a given nominal task assignment can work on a different task assignment. For example, a technician assigned to customer queuing can work on ticket pooling during idle customer queuing periods. The flexible working assignments, as mentioned earlier, can complicate the measurement of data services center technician performance.

In determining performance measures, as illustrated by the exemplary data services center, several issues can be taken into consideration. First, the weight of each task used to calculate the assignment-wise and total productivity score can be chosen so that employees with different mixes of job assignments can be compared fairly and consistently. As exemplified above, employees having different job assignments can work on the same tasks from time to time. Since the job activity (e.g., the relative importance of each task) for each assignment can be different, the weight of a given task can be different for different job assignments. To have productivity scores comparable across tasks, job assignments can have their own model for the assignment-wise productivity score. Second, over the period of time in which a productivity score is to be generated, employees can work on several assignments. A measurement method can be capable of combining the scores of these different assignments into a single productivity score.

SUMMARY

The disclosed methods and systems can develop productivity measures for employees with different job task assignments that can be quantitatively compared. Statistical control charts based on the constructed measures of job productivity can be used to identify outstanding employees, or poorly performing employees. The methods and systems can elicit from managers statistical linkages between task component measures and a productivity index. The methods and systems can provide a productivity measure for employees with related but distinct task assignments, and with different time allocations to these assignments. Thus, the methods and systems can disentangle differences in assignments and time allocations among employees such that the employees can be directly and statistically compared.

Evaluations of modeled task performance scores can be obtained and analysis of the evaluations, e.g., a regression analysis, can be performed to obtain performance parameters. The performance parameters can be applied to employee task performance scores over a selected time frame to obtain productivity scores for the employees. The statistical control charts can be based on the productivity scores so obtained.

In one embodiment, a method of determining comparable performance measures for employees having differing task assignments can include generating sets of task scores based on a selected model design of the task assignments, performing evaluations of the sets of task scores to assign productivity scores to the sets of task scores, analyzing the productivity scores to determine productivity parameters, and applying the productivity parameters to task scores for the employees to obtain the performance measures for the employees.

The selected model design can be a centralized composite design. Generating the sets of task scores can include determining whether the number of sets of task scores exceeds a predetermined number, and modifying the centralized composite design by a fractional factorial when the number of sets of task scores exceeds the predetermined number. Generating can include adding a number of recorded task scores to the sets of task scores, and the sets of task scores can be scaled to represent performance by employees over a common work period, with a fixed number of hours worked.

The evaluations can be performed by a number of evaluators who can be familiar with the task assignments and with assigning productivity scores. The evaluators can be assigned evaluator parameters, and the productivity scores assigned by each of the evaluators can be compared using the evaluator parameters to determine anomalous ones of said plurality of evaluations. The anomalous evaluations can be removed and the analyzing can be repeated. The productivity scores assigned to the recorded task scores by each of the evaluators can be used as one of the evaluator parameters.

The method can include applying linear regression techniques to the productivity scores, wherein the linear regression is applied to the expression $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a $k^{th}$ task of assignment t,
$PS_t$ is a productivity score for assignment t as a function of the measured values, $F_{t1}, F_{t2}, \ldots F_{tK}$, and
$\alpha_t$, $\beta_{tk}$ and $\gamma_{tkk'}$ are the productivity parameters.

The method can include calculating statistical measures for the performance measures over a selected time period, and identifying employees having performance measures outside a range of the statistical measures. The method can further include identifying trends in the performance measures over multiple ones of the selected time periods.

In one embodiment, a method of determining productivity parameters for evaluating employee performance for employees having differing task assignments can include generating sets of task scores based on a selected model design of the task assignments, performing a plurality of evaluations of the sets of task scores, whereby the evaluations assign productivity scores to the sets of task scores, applying linear regression techniques to the productivity scores to obtain the productivity parameters using an expression having the form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a $k^{th}$ task of assignment t,
$PS_t$ is a productivity score for assignment t as a function of the measured values, $F_{t1}, F_{t2}, \ldots F_{tK}$, and
$\alpha_t$, $\gamma_{tk}$ and $\gamma_{tkk'}$ are the productivity parameters.

The method can determine whether the sets of task scores exceed a predetermined number and can modify the selected model design by a fractional factorial when the predetermined number is exceeded. A number of recorded task scores can be added to the sets of task scores. The sets of task scores can be scaled to represent performance by employees over a common work period, with a fixed number of hours worked. The evaluations can be performed by a number of evaluators who are familiar with the task assignments and with assigning productivity scores. Evaluator parameters can be assigned to each of the evaluators and the productivity scores assigned by each of the evaluators can be compared using the evaluator parameters. Anomalous evaluations can be removed and the analysis of the productivity scores can be repeated. The productivity scores assigned to the recorded task scores by each of the evaluators can be used as one of the evaluator parameters.

In one embodiment, a computer-readable medium, which contains instructions for controlling a computer system to determine comparable performance measures for employees having differing task assignments, can control the computer system to generate sets of task scores based on a selected model design of the task assignments, obtain a plurality of evaluations of the sets of task scores, the evaluations assigning productivity scores to the sets of task scores, apply linear regression techniques to the productivity scores to determine productivity parameters, and apply the productivity parameters to task scores for the employees so as to obtain the performance measures for the employees.

The linear regression can be applied to an expression for the productivity scores of the form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a $k^{th}$ task of assignment t,
$PS_t$ is a productivity score for assignment t as a function of the measured values, $F_{t1}, F_{t2}, \ldots F_{tK}$, and
$\alpha_t$, $\beta_{tk}$ and $\gamma_{tkk'}$ are the productivity parameters.

The evaluations can be performed by a number of evaluators familiar with the task assignments and with assigning productivity scores. Evaluator parameters can be assigned to each of the plurality of evaluators and the productivity scores assigned by each of the evaluators can be compared using the evaluator parameters so as to determine anomalous evaluations. The anomalous evaluations can be removed and the analysis of the productivity scores can be repeated. Recorded task scores can be added to the sets of task scores, and the productivity scores assigned to the recorded task scores by each of the evaluators can be used as one of the evaluator parameters.

In one embodiment, a computer implemented application on computer-readable medium can include instructions to compare employee performance for employees having differing task assignments. The application can compare employee performance by generating sets of task scores based on a selected model design of the task assignments, obtaining evaluations of the sets of task scores to assign productivity scores to the sets of task scores, analyzing the productivity scores to determine productivity parameters, applying the productivity parameters to task scores for the employees to obtain performance measures for the employees, calculating statistical measures for the performance measures over a selected time period, and identifying employees having performance measures outside a range of the statistical measures.

The instructions for analyzing can include instructions for applying linear regression techniques to an expression for said productivity scores of a form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a $k^{th}$ task of assignment t,
$PS_t$ is a productivity score for said assignment t as a function of said measured values, $F_{t1}, F_{t2}, \ldots F_{tK}$, and
$\alpha_t$, $\beta_{tk}$ and $\gamma_{tkk'}$ are said productivity parameters.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
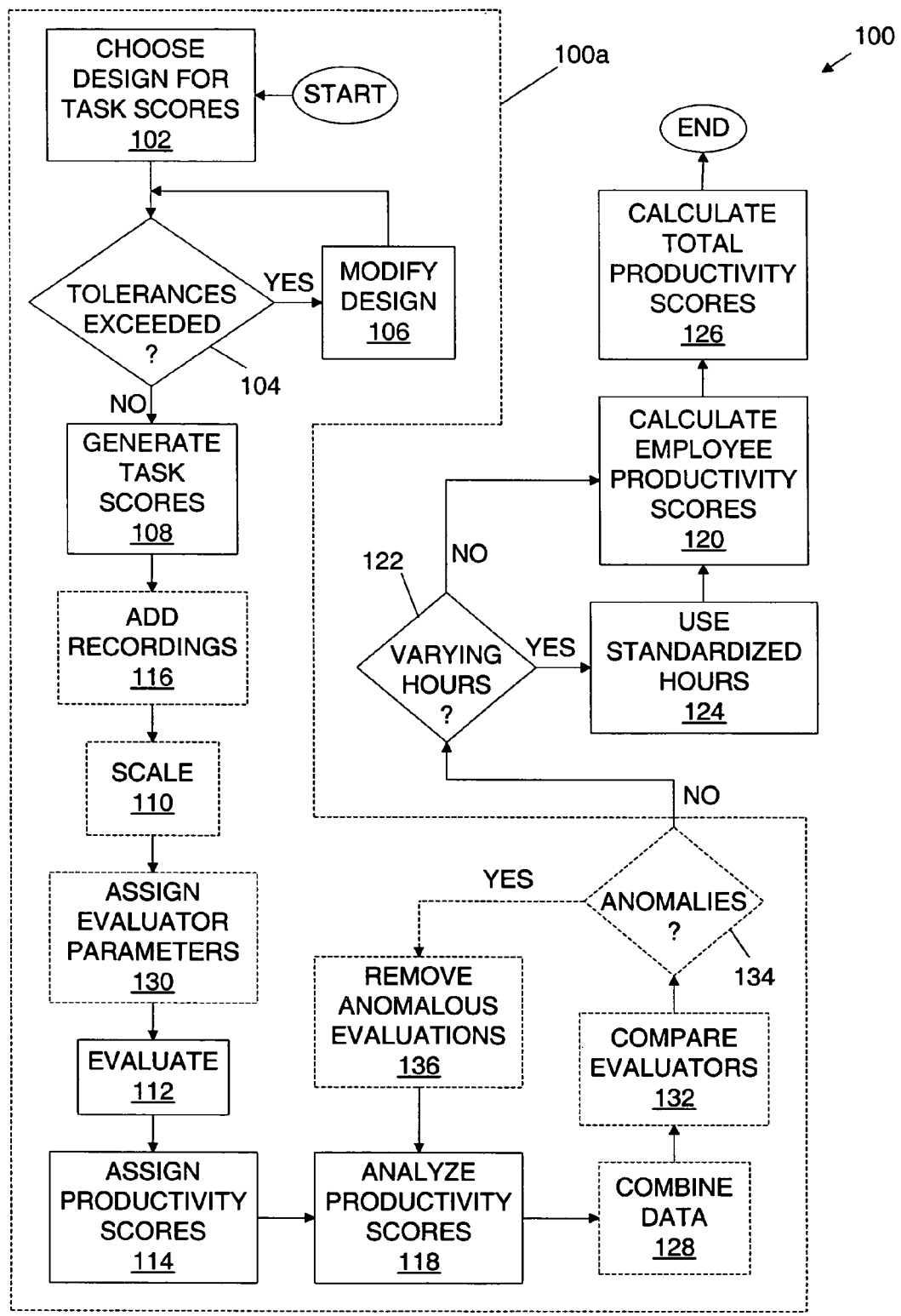
FIG. 1 illustrates a flow chart of a method of developing personnel productivity indices.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

The methods and systems described herein can construct a single productivity score for an employee, regardless of his/her allocation of time to separate job assignments. The productivity score can be based on the employee's job performance on a number of tasks performed in the performing the job assignments over a specific period of time. The methods and systems described herein can assign productivity index values to a set of employees engaged in several distinct tasks, wherein the performance of the tasks can be characterized by a common or overlapping set of measures.

In general, the Total Productivity Score of an employee i, i=1, 2, ..., n can be written as $TPS_i$, where $$TPS_i = \sum_{t=1}^{T} \pi_{it} PS_t(F_{t1}, F_{t2}, \ldots, F_{tK}); \quad [1]$$

$F_{tk}$: the measured value for the $k^{th}$ task of assignment t;
$PS_t$: the productivity score for assignment t, a function of the measures $F_{t1}, F_{t2}, \ldots F_{tK}$; and
$\pi_{it}$: known proportion of the evaluation period the employee i spends performing assignment t. Generally, the proportions $\pi_{it}$ can be known since the employee can be given the particular assignment for a proportion of time $\pi_{it}$, t=1, 2, ... T.

The productivity score function $PS_t$ for the assignments t can be estimated. The function can be parameterized as a linear combination of the task measures $F_{t1}, F_{t2}, \ldots F_{tK}$:

$$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'}, \quad [2]$$

where the parameters $\alpha_t$, $\beta_{tk}$ and $\gamma_{tkk'}$ can be estimated, e.g. by least squares. It can be understood that more complex models than the linear combination of Equation 2 can be contemplated, e.g., higher order polynomial terms for the components can be considered and/or higher order interactions can be included. The use of higher order polynomial terms can be of value as component task score increases in very high or very low ranges can have less effect than increases near their mid-ranges.

As an example of the use of higher order interactions, an employee's scores on one task can be interpreted differently based on the scores on another task, resulting in a two-component interaction (the last term of Equation 2). Using the data services center example previously discussed in the Background section, an employee assigned to customer queuing can answer a large number of trouble calls (e.g., a first task), while diagnosing few resulting trouble tickets (e.g., a second task). Such an employee can be characterized as having poor ticket follow-through, such that the customer queuing assignment productivity score can be downgraded. A third-order interaction, wherein the effect of a third component can depend on the scores from two other components, can also be contemplated, though such interactions be seen to be more complicated and more difficult to interpret.

As previously mentioned, a standard least squares linear regression can be used to estimate the parameters $\alpha_t$, $\beta_{tk}$ and $\gamma_{tkk'}$, though it can be understood that other methods for estimating parameters for sets of equations can be used. The estimate can be obtained from productivity scores observed for some homogeneous set of employees for whom the K measurements $PS_t$ can also be recorded. However, even if such scores are available from employee records, they can occur in patterns that do not afford precise estimation. In typical employment situations, for example, such scores can tend to occur in the middle of the range of possible scores. In addition, low scores are not likely to be available, as employees having low scores can be re-trained or terminated. Thus, the use of observed productivity scores can skew the estimation of the parameters $\alpha_t$, $\beta_{tk}$ and $\gamma_{tkk'}$, such that employees outside the middle range and particularly poor performers may not be properly represented.

As an alternative to the use of observed scores, sets of component task scores $F_{t1i}, F_{t2i}, \ldots F_{tKi}$, can be specified for $i=1, 2, \ldots n$ observations. The sets can be evaluated to elicit productivity scores $PS_{ti}$ for the $i=1, 2, \ldots n$ observations. The evaluations can be performed by personnel familiar with the task/assignment requirements. The specified sets of component task scores can be chosen, or designed, to provide an estimation of the parameters of the productivity score $PS_{ti}$, than would be available using the previously mentioned observed productivity scores for a homogenous set of employees.

In one embodiment, a Centralized Composite Design, as known in the art, can provide a near optimal design that allows the estimation of second-order interactions and even higher-order polynomial terms. The basic design can include identifying Medium, High and Low values for the component task scores for the k tasks of the t assignments. The values can be obtained from personnel familiar with expectations for the task components. Again referring to the data services center example, a manager can expect that an average employee can answer 30 trouble calls per day, while a motivated employee can answer 50 calls and a less-motivated employee can answer only 20 calls. The values 30, 50 and 20 can be scaled such that the average employee corresponds to a Medium value of 0, the motivated employee corresponds to a High value of +1 and the less-motivated employee corresponds to a Low value of −1. For the example values of 30, 50 and 20, the values can be scaled by subtracting 30 from a cited component score and dividing the result by 20 for positive values or by 10 for negative values.

Figure 5:
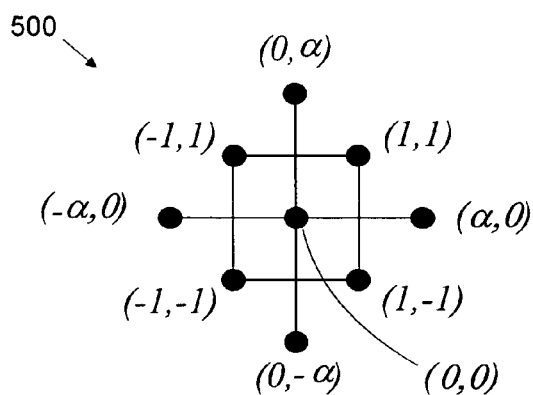
FIG. 5 illustrates a K-dimensional cube having K-tuples of component scores for use in the method of FIG. 1.

Thus, the component scores can be coded as 0, +1, or −1, taken in the above example from (30−30)=0, (50−30)/20=+1, and (20−30)/10=−1. Thus in general, the Centralized Composite Design for K components can include of three kinds of K-tuples of component scores:

1) $2^K$ K-tuples (+/−1, ... +/−1) at the vertices of a K-dimensional cube surrounding the zero point (0, 0, ..., 0),
2) 2K K-tuples (+/−α, 0, ..., 0), (0, +/−α, 0, ..., 0), ... (0, 0, ..., 0, +/−α), where α is a coded value >1, chosen by the formula $\alpha=(2^K)^{0.25}$, and
3) m replications of the coded K-tuple (0, 0, ..., 0), with m taken as $4\sqrt{2^K+1}-2K$, though generally in practice m>1. FIG. 5 can illustrate the Centralized Composite Design as a K-dimensional cube 500 for K=2.

The design for K=2 can include eight combinations of component task scores, plus m replications at (0,0). The result can be a sufficiently small set of components scores so as to avoid fatigue of the personnel performing the evaluations. For assignments having greater numbers of tasks K, the evaluation of $2^K$ K-tuples can be fatiguing. To not induce respondent fatigue, a design can be constructed having a fewer number of evaluations. In such cases, a fractional factorial design with $2^{K-r}$ K-tuples can be substituted for the vertices of the K-dimensional cube in FIG. 3, so that selected higher-order interactions among the components can be aliased with each other or with lower order effects. The values for m and r can be chosen such that the total size of the design, or total number of scenarios presented, does not produce fatigue.

Certain lower order interactions can be deemed to be especially likely to be non-zero, and these interactions can be aliased with higher order effects, so that if this effect is estimated to be non-zero, one may presume that it is the lower order effect, rather than the higher, that is non-zero. The K tasks in these experiments can be performed in sequence so that low-order interactions between consecutive tasks can be especially likely to be non-zero, and can then be aliased with higher-order effects. Such designs can be obtained from the literature, e.g., see, Schmidt and Launsby *Understanding Industrial Designed Experiments* (4th Ed.), Colorado Springs, Colo.: Air Academy Press (1994).

Key concepts in choosing the fractional factorial can include selecting a specific fraction based on a design generator that can specify a set of component interactions that can be aliased, or estimated by the same combination of experimental observations so as to appear indistinguishable. As an example, task components can be physically or conceptually sequential and aliases can be chosen so that only widely spaced components are aliased. Referring once again to the data services center example, the four identified tasks (answering incoming calls, opening trouble tickets, coordinating troubleshooting, and closing tickets) can be completed sequentially in the order listed. Thus, a generator can be chosen that aliases coordinating troubleshooting with the interaction of opening trouble tickets and closing tickets.

It can be understood that the general literature describes the process of choosing generators to satisfy certain aliasing patterns for $2^K$ designs. For K tasks, a single generator can have the form I=AB, where I can represent each task at its lower lever, and A, B, C, D, ... can represent each of A, B, C, D, ... at its higher level, which can indicate that the design configuration with each task at its lowest level (I) is aliased with the configuration where only tasks A and B are at their higher levels. Such a form can determine the design completely. There can be r separate generators specified for a $2^{K-r}$ design. As an example, if A denotes opening a ticket, B is the coordination of troubleshooting, and C denotes closing a ticket, then the generator which aliases the coordination of trouble shooting with the interaction of opening and closing tickets can be B=AC.

Referring to FIG. 1, a flowchart illustrates a method 100 of developing productivity measures for employees. Method 100 can start by choosing a design for the sets of component task scores, as at 102. If the chosen design results in the number of combination scores to be evaluated exceeding known or estimated measures for the number of combination scores that can be tolerated without causing fatigue, as determined at 104, the design can be modified by using a fractional factorial design, as at 106 and described above. Using the chosen generator, task score combinations can be generated (108).

Optionally, the combinations can be scaled so as to represent performance by employees over a common work period, with a fixed number of hours worked, as shown in phantom at 110. The scaled task score combinations can be evaluated (112) and productivity scores can be assigned (114) for the entire assignment. In one embodiment, the task scores presented for evaluation can include recordings of actual employee task scores that the evaluators can use as reference points in evaluating the other task score combinations (shown in phantom at 116). In one embodiment, the recordings can be used to gauge evaluator performance by providing a reference point for comparing the evaluations, as described in further detail below.

The productivity scores resulting from the evaluations can be analyzed, e.g. by using linear regression techniques, to obtain estimates of the parameters $\alpha_t$, $\beta_{tk}$, and $\gamma_{tkk'}$ as at 118. Once estimated, the estimates for parameters $\alpha_t$, $\gamma_{tk}$, and $\gamma_{tkk'}$ can be substituted in Equation 2 to calculate productivity scores for the employees (120). In the case where employees are assigned to a given assignment for varying numbers of hours, as determined at 122, the productivity scores can be calculated based on a standardized number of hours (124), such as $F_{tk}'=F_{tk}/H_t$, where $H_t$ is the number of hours worked at assignment t by a given employee. Thus, an employee's productivity score can be calculated by:

$$PS_t(F_{t1}, F_{t2}, \ldots, F_{tK}) = \hat{\alpha}_t + \sum_{k=1}^{K} \hat{\beta}_{tk} F_{tk}' + \sum_{k=1}^{K} \sum_{k'=1}^{K} \hat{\gamma}_{tkk'} F_{tk}' F_{tk'}', \quad [3]$$

where $\{\hat{\alpha}_t, \hat{\beta}_{tk}, \hat{\gamma}_{tkk'}\}$ are the parameter estimates from the analysis described above. Based on the calculated productivity scores, the employee's total productivity score. $TPS_i$ can be calculated from Equation 1 using the known weights $\{\pi_{it}\}$, as at 126, and method 100 can end.

It is possible that evaluators participating in the above described productivity scoring can provide inconsistent scores. It can be seen that the linear model analysis at 118 can also optionally identify evaluators whose scorings conflict with others. Optionally and as illustrated in phantom in FIG. 1, by combining data from the evaluations across the evaluators, at 128, one can model the role of the evaluators in several ways. In one model, a parameter can be assigned to an evaluator (130) so that uniform raising or lowering of productivity scores by the evaluator, compared with the mean of the productivity scores, can be discerned. Interactions between the parameters $\alpha_t$, $\beta_{tk}$ and $\gamma_{tkk'}$ and the evaluators can also be discerned using the assigned evaluator parameter. In one embodiment, the recordings of actual employee task scores can serve as a gauge for comparing evaluators, as previously noted.

Once the data is combined at 128, the productivity scores of the evaluators can be compared (132). If anomalous productivity scores are discerned at 134, the anomalous productivity scores can be removed (136) and the remaining scores can be analyzed again by returning to 118. When no anomalous scores are found, the method can proceed to 122. It can be seen that through the construction of these kinds of exploratory regression models, evaluator bias and other measures of data reliability can be measured.

Figure 2:
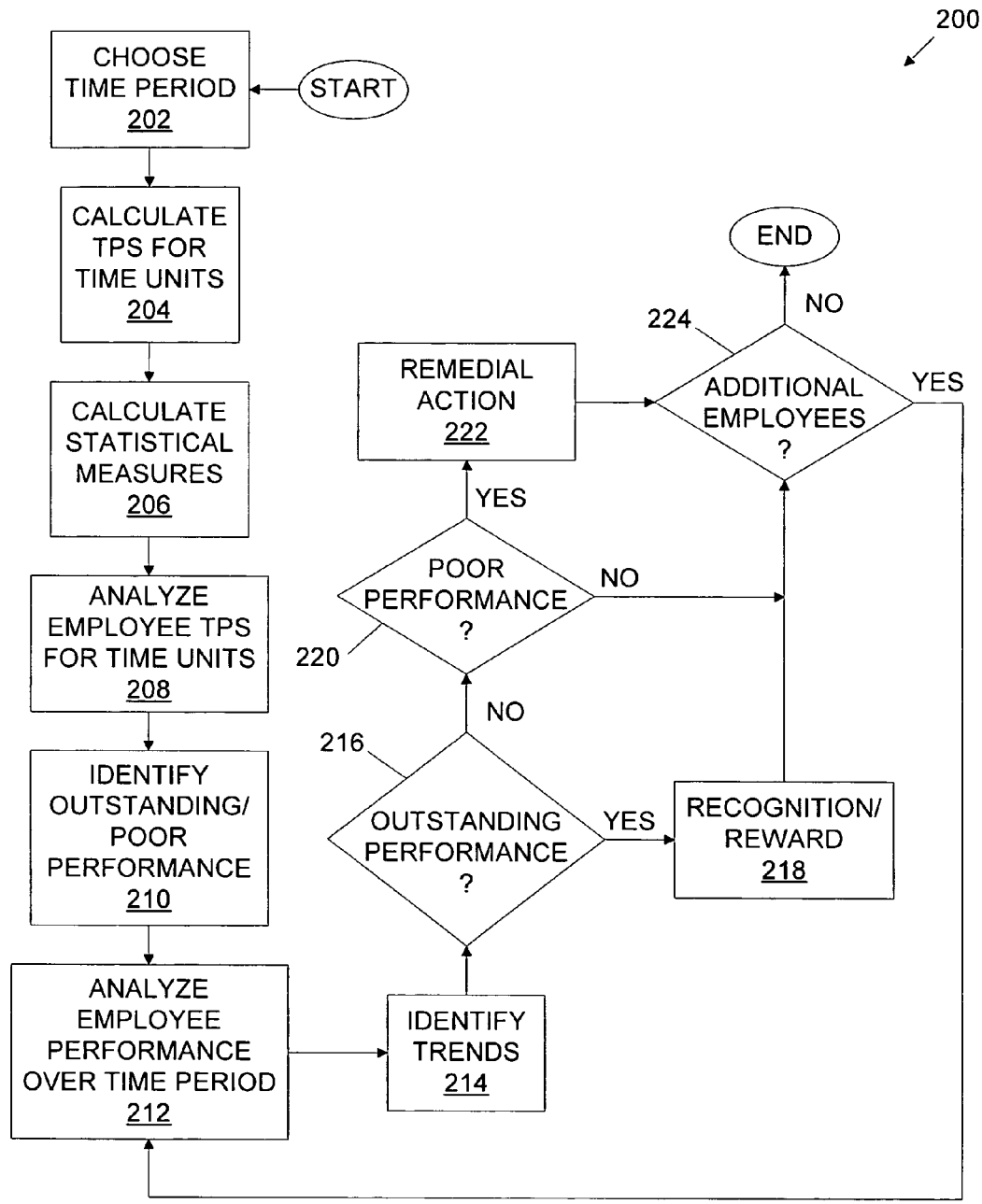
FIG. 2 illustrates a flow chart of a method of determining personnel performance using the performance productivity indices of the method of FIG. 1.

Using method 100, estimates of the parameters of an employee productivity score for employee assignments can be determined. Using the estimated parameters, assignment scores and total productivity scores for the employees can be determined. FIG. 2 illustrates a flow chart for a method 200 of analyzing the productivity scores to identify employees whose performance can be considered outstanding and those employees whose performance can be in need of remediation. It can be understood that the portion 100a of method 100 wherein the estimates of the parameters can be obtained can be performed separately from calculating employee and total productivity scores. Thus, one can predetermine the parameters and repeatedly use the predetermined parameters to obtain the productivity scores used in the performance analysis of method 200.

Such above normal or below normal performance can be identified using standard statistical control charts known in the art. Method 200 can start by choosing a time period (202) over which employees can have their performance assessed. In one embodiment, a month can be chosen as an assessment period, though other time periods consistent with providing a time period being long enough to allow supervisors time to meet with employees under their supervision, yet short enough to allow for correction of poor performance by employees prior to such poor performance becoming habitual. Thus, the time period chosen can be seen to reflect the specific employment situations being analyzed.

Upon choosing the time period, total productivity scores $TPS_i$, i=1, 2, ..., n, can be calculated for the employees for shorter time units making up the time period, as at 204. As an example for the month time period discussed above, productivity scores can be calculated for one week time periods, though it can be understood that other time units can be used. The time unit used can be such as to obtain productivity scores consistent with their being generated by a Normal distribution. Statistical measures of the scores can be determined (206), including such measures as the standard deviation and the mean, taken over the time units of the assessment time period, and across the employees being compared.

If the productivity scores are not consistent with their generation by a Normal distribution, then a mathematical function can be used to transform the productivity scores such that the transformed data approach Normality. Increasing the time unit can facilitate the success of such a transformation, or in some instances can eliminate the need for the transformation. It can be seen that the choice of transformation and time period can be empirical. Additionally, the choice of time unit can be such as to be consistent with managerial need to provide prompt feedback to the employees being evaluated.

Analysis (208) of employee total productivity scores for the time units can be performed to identify (210) outstanding or poor employee performance within the time units. As an example, control limits consistent with statistical standards, e.g., +/−2 standard deviations from the overall mean, can be calculated. Employees having total productivity scores above the control limit can be candidates for outstanding performance ratings, while employees having total productivity scores below the control limit can be identified as potential poor performers.

Figure 3:
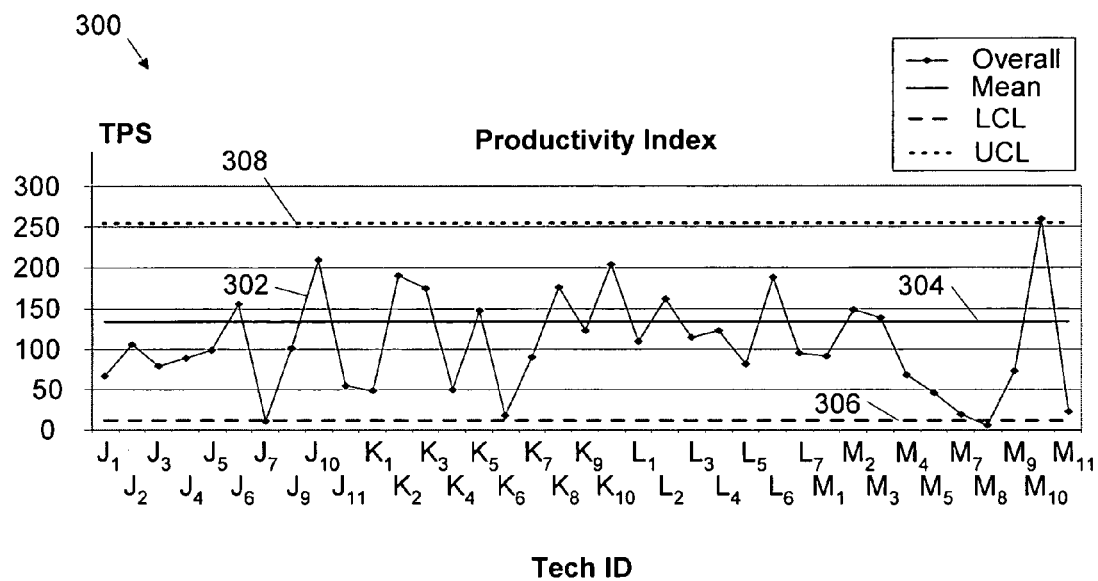
FIG. 3 illustrates an exemplary statistical control chart of the productivity indices determined for a group of employees using the method of FIG. 1.

FIG. 3 illustrates a hypothetical example of a control chart 300, showing productivity scores, or indices plotted for a number of employees (line 302). The mean of the plotted scores is shown as line 304 in FIG. 3, a lower control limit (LCL) is shown as dashed line 306 in FIG. 3, and an upper control limit (UCL) is shown as dotted line 308 in FIG. 3. For the illustrative chart of FIG. 3, employee $M_8$ can be seen to have a performance index below the LCL, indicating that action can be taken to improve performance. Employees $J_7$, $K_6$ and $M_{11}$ can be seen to have marginal performance indices near, but not below, the LCL. Such indications can alert a supervisor that these employees' performance bears closer attention if marginal performance continues in succeeding time periods. Employee $M_{10}$ can be seen to have a performance index above the UCL, indicating the employee can be considered for an outstanding performance rating.

The total productivity scores for the time units over the chosen time period can be analyzed (212) to identify (214) employee performance trends. A wide range of statistical measures or rules as are known in the art can be used for detecting patterns of performance for employees, including having two of three consecutive scores between two and three standard deviations, having four consecutive declining scores, etc. Those employees meeting the criteria established for defining outstanding performance, as determined at 216, can be recognized, and/or otherwise rewarded for their efforts, as at 218. An employee identified as being a poor performer, as determined at 220, can receive training, reprimand, termination, and/or other remedial actions as determined appropriate to correct the employee's performance (222). The method 200 can end when no additional employee performance trends are to be analyzed, as determined at 224.

Figure 4:
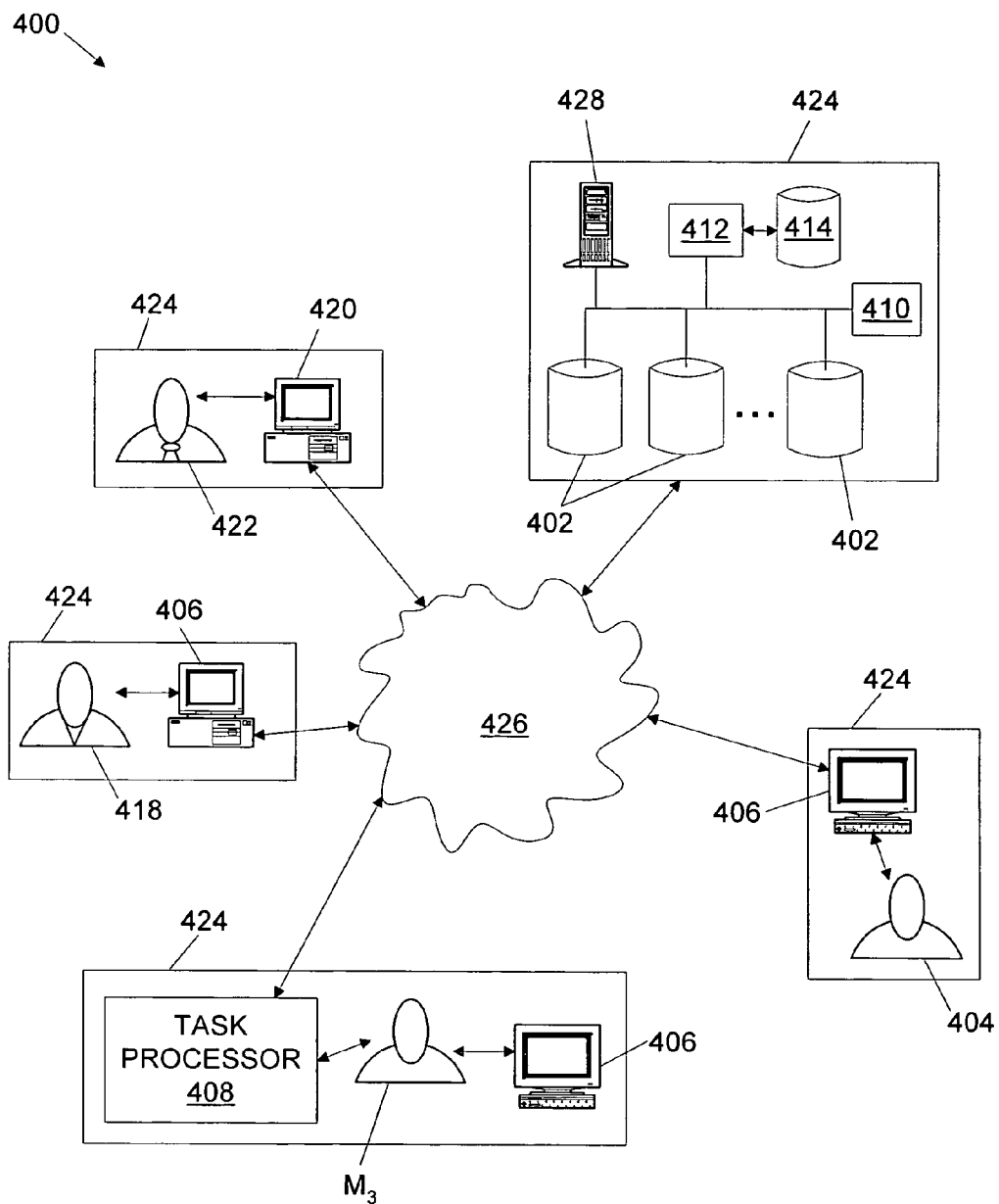
FIG. 4 illustrates a block diagram of a system for performing the method of FIG. 1.

Referring to FIG. 4, a system 400 can implement the methods 100 and 200. System 400 can include one or more databases 402 for maintaining data regarding the numbers of tasks completed, and the time spent on assignments. As an example, for the data services center previously described, the data in database 402 can indicate that employee $M_3$ spent x hours of a particular day in the customer queuing assignment, during which time employee $M_3$ answered y customer calls and opened z trouble tickets. The data can be entered into database 402 by employee $M_3$, or other timekeeper 404, using input device 406, such as a terminal, personal computer, or other known data entry device. In one embodiment, task and time logs can be maintained by task processor 408, which employee $M_3$ can use in the performance of assignments and which can monitor employee activity and record tasks and time spent on the tasks directly to database 402, or through system processor 410.

It can be understood that data can reside in separate databases 402. Returning again to the data services center example, calls answered for a particular day can be recorded in one database 402, while repair ticket activities can be recorded in another database 402. Performance processor 412 can assemble the data for calculating productivity scores from the databases 402 by aggregating hours over the individual days in the month under examination to obtain total hours for the various assignments, and the total task component scores for the various tasks. In one embodiment, performance processor 412 can include instructions contained on computer medium 414 for performing methods 100 and 200 so as to determine the performance parameters, calculate the total productivity scores and analyze employee performance.

System 400 can include evaluator devices 416, such as a terminal or personal computer, through which evaluators 418 can interface with method 100 so as to obtain the task scores and input their evaluations of the model task scores. Evaluators 418 can be supervisors or others familiar with the assignments and tasks being performed and with assigning productivity scores for the work. System 400 can further include supervisor devices 420, such as a terminal or personal computer, through which supervisors 422 can interface with methods 100 and 200 for evaluating employee performance.

The systems and implementations thereof described herein may not be limited to particular components or configurations. For example, system 400 can be distributed among a number of network nodes 424 that can communicate and cooperate over network 426, such as an intranet and/or the Internet, to provide users with a seamless interface experience. In addition, devices 406, 416 and/or 420 can include devices capable of accessing system 400 through network 426, including personal computers, wireless phones, PDA's and the like. Nodes 424 can include servers or network processors 428 for interfacing devices 406, 416 and/or 420 to network 426.

Processors 408, 410, 412 and/or 428 can include volatile memory and non-volatile memory, e.g., storage medium 414, for storing data, such as at database 402, and other data corresponding to input and output values and other intermediate computations for the methods 100 and 200. The memory can include instructions for executing the methods 100 and 200, which can be transferred, in the course of operation, from the non-volatile memory to the volatile memory and to the processor for execution.

Additionally, the flow charts in FIGS. 1 and 2 illustrate exemplary implementations of methods 100 and 200 and other configurations can be contemplated and/or other actions, decisions, menus and the like can be included, as for example the optional actions indicated in phantom. Further, it should be understood that processors 408, 410, 412 and/or 428 can include and/or be combined into one or more processors for interfacing with employees, timekeepers, evaluators, supervisors, and the like, and for performing method 100 and/or method 200.

The systems and methods described herein may not be limited to a particular hardware or software configuration; they may find applicability in many computing or processing environments. They can be implemented in hardware or software, or a combination thereof. Preferably, the methods 100 and 200 can be implemented in computer programs running in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of determining comparable performance measures for employees having differing task assignments, comprising:
   storing employee task data in a database of a computing system, wherein said employee task data includes a number of tasks completed and an amount of time spent on at least one completed task;
   generating, in a computer having a processor and a memory, sets of task scores based on a selected model design of task assignments utilizing said employee task data;
   selecting a centralized composite design as said model design;
   performing a plurality of evaluations of said sets of task scores, said evaluations assigning productivity scores to said sets of task scores;
   analyzing said productivity scores to determine productivity parameters, wherein analyzing said productivity scores comprises using said processor, according to instructions stored in said memory, to apply linear regression techniques to said productivity scores utilizing said computing system; and
   applying, in the computer, said productivity parameters to employee task scores for said employees to obtain said performance measures for said employees.

2. The method of claim 1, wherein said linear regression is applied to an expression for said productivity scores having a form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
   $F_{tk}$ is a measured value for a k task of assignment t,
   $PS_t$ is a productivity score for said assignment t as a function of said measured values, $F_{t1}, F_{t2}, \ldots F_{tK}$, and
   $\alpha_t, \beta_{tk}$ and $\gamma_{tkK'}$ are said productivity parameters.

3. The method of claim 1, wherein generating said sets of task scores comprises:
   determining whether said sets of task scores exceed a predetermined number; and
   modifying said centralized composite design by a fractional factorial when said sets of task scores exceed said predetermined number.

4. The method of claim 1, further comprising:
   calculating statistical measures for said performance measures over a time period; and
   identifying employees having performance measures outside a range of said statistical measures.

5. The method of claim 4, further comprising identifying trends in said performance measures over multiple ones of said time period.

6. The method of claim 1, wherein generating sets of task scores comprises adding a number of recorded task scores to said sets of task scores.

7. The method of claim 6, wherein said sets of task scores are scaled to represent performance by employees over a common work period, with a fixed number of hours worked.

8. The method of claim 1, wherein said plurality of evaluations are performed by a plurality of evaluators, said evaluators being familiar with said task assignments and with assigning productivity scores.

9. The method of claim 8, further comprising:
   assigning evaluator parameters to each of said plurality of evaluators;
   comparing said plurality of productivity scores assigned by each of said evaluators using said evaluator parameters in analyzing said productivity scores to determine anomalous ones of said plurality of evaluations;
   removing said anomalous ones of said plurality of evaluations; and
   returning to analyzing said productivity scores.

10. The method of claim 9, wherein said sets of task scores are scaled to represent performance by employees over a common work period, with a fixed number of hours worked.

11. The method of claim 8, wherein generating sets of task scores comprises adding a number of recorded task scores to said sets of task scores, and using productivity scores assigned to said recorded task scores for each of said evaluators as one of said evaluator parameters.

12. The method of claim 1, wherein generating said sets of task scores comprises:
   determining whether said sets of task scores exceed a predetermined number; and modifying said selected model design by a fractional factorial when said sets of task scores exceed said predetermined number.

13. The method of claim 12, wherein analyzing said productivity scores comprises applying linear regression techniques to said productivity scores.

14. The method of claim 13, wherein said linear regression is applied to the expression $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a k task of assignment t,
$PS_t$ is a productivity score for said assignment t as a function of said measured values, $F_{t1}, F_{t2}, \ldots F_{tK}$, and
$\alpha_t$, $\beta_{tk}$ and $\gamma_{tkK'}$ are said productivity parameters.

15. The method of claim 14, wherein said plurality of evaluations are performed by a plurality of evaluators, said evaluators being familiar with said task assignments and with assigning productivity scores.

16. The method of claim 15, further comprising:
assigning evaluator parameters to each of said plurality of evaluators;
comparing said plurality of productivity scores assigned by each of said evaluators using said evaluator parameters in analyzing said productivity scores to determine anomalous ones of said plurality of evaluations;
removing said anomalous ones of said plurality of evaluations; and
returning to analyzing said productivity scores.

17. The method of claim 16, wherein generating sets of task scores comprises adding a number of recorded task scores to said sets of task scores, and using productivity scores assigned to said recorded task scores for each of said evaluators as one of said evaluator parameters.

18. The method of claim 17, further comprising:
calculating statistical measures for said performance measures over a selected time period; and
identifying employees having performance measures outside a range of said statistical measures.

19. The method of claim 18, further comprising identifying trends in said performance measures over multiple ones of said selected time periods.

20. A method of determining productivity parameters for evaluating employee performance for employees having differing task assignments, comprising:
storing employee task data in a database of a computing system, wherein said employee task data includes a number of tasks completed and an amount of time spent on at least one completed task;
generating, in a computer having a processor and a memory, sets of task scores based on a selected model design of task assignments utilizing said employee task data;
selecting, in the computer, a centralized composite design as said model design;
performing a plurality of evaluations of said sets of task scores, said evaluations assigning productivity scores to said sets of task scores; and
using said processor, according to instructions stored in said memory, to apply linear regression techniques to said productivity scores utilizing the computing system to obtain said productivity parameters using an expression having a form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where
$F_{tk}$ is a measured value for a k task of assignment t,
$PS_t$ is a productivity score for said assignment t as a function of said measured values, $F_{t1}, F_{t2}, \ldots F_{tK}$, and
$\alpha_t$, $\beta_{tk}$ and $\gamma_{tkK'}$ are said productivity parameters.

21. The method of claim 20, wherein generating said sets of task scores comprises:
determining whether said sets of task scores exceed a predetermined number; and
modifying said selected model design by a fractional factorial when said sets of task scores exceed said predetermined number.

22. The method of claim 20, wherein generating said sets of task scores comprises adding a number of recorded task scores to said sets of task scores.

23. The method of claim 22, wherein said sets of task scores are scaled to represent performance by employees over a common work period, with a fixed number of hours worked.

24. The method of claim 20, wherein said plurality of evaluations are performed by a plurality of evaluators, said evaluators being familiar with said task assignments and with assigning productivity scores.

25. The method of claim 24, further comprising:
assigning evaluator parameters to each of said plurality of evaluators;
comparing said plurality of productivity scores assigned by each of said evaluators using said evaluator parameters in analyzing said productivity scores to determine anomalous ones of said plurality of evaluations;
removing said anomalous ones of said plurality of evaluations; and
returning to analyzing said productivity scores.

26. The method of claim 25, wherein generating said sets of task scores comprises adding a number of recorded task scores to said sets of task scores, and using productivity scores assigned to said recorded task scores for each of said evaluators as one of said evaluator parameters.

27. A computer-readable medium containing instructions for controlling a computer system to determine comparable performance measures for employees having differing task assignments, said instructions controlling said computer system to:
store employee task data, wherein said employee task data includes a number of tasks completed and an amount of time spent on at least one completed task;
generate, in a computer having a processor and a memory, sets of task scores based on a selected model design of task assignments utilizing said employee task data, wherein said model design is a centralized composite design;
obtain a plurality of evaluations of said sets of task scores, said evaluations assigning productivity scores to said sets of task scores;
use said processor, according to instructions stored in said memory, to apply linear regression techniques to said productivity scores to obtain said productivity parameters using an expression having a form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where $F_{tk}$ is a measured value for a k task of assignment t,
$PS_t$ is a productivity score for said assignment t as a function of said measured values, $F_{t1}, F_{t2}, \ldots F_{tK}$, and
$\alpha_t$, $\beta_{tk}$ and $\gamma_{tkK'}$ are said productivity parameters; and
apply said productivity parameters to employee task scores for said employees to obtain said performance measures for said employees.

28. The computer-readable medium of claim 27, wherein said plurality of evaluations are performed by a plurality of evaluators, said evaluators being familiar with said task assignments and with assigning productivity scores.

29. The computer-readable medium of claim 28, further comprising instructions for controlling the computer to:
assign evaluator parameters to each of said plurality of evaluators;
compare said plurality of productivity scores assigned by each of said evaluators using said evaluator parameters in analyzing said productivity scores to determine anomalous ones of said plurality of evaluations;
remove said anomalous ones of said plurality of evaluations; and
return to analyzing said productivity scores.

30. The computer-readable medium of claim 29, wherein:
said instructions to generate said sets of task scores comprise instructions for controlling the computer to add a number of recorded task scores to said sets of task scores; and
said instructions to compare said plurality of productivity scores comprise instructions for controlling the computer to use said productivity scores assigned to said recorded task scores by each of said evaluators as one of said evaluator parameters.

31. A computer implemented application on computer-readable medium, said application comprising instructions to compare employee performance for employees having differing task assignments, said application comparing employee performance by:
storing employee task data, wherein said employee task data includes a number of tasks completed and an amount of time spent on at least one completed task;
generating, in a computer having a processor and a memory, sets of task scores based on a selected model design of task assignments utilizing said employee task data, wherein said model design is a centralized composite design;
obtaining a plurality of evaluations of said sets of task scores, said evaluations assigning productivity scores to said sets of task scores;
using said processor, according to instructions stored in said memory, to analyze said productivity scores to determine productivity parameters;
applying said productivity parameters to employee task scores for said employees to obtain performance measures for said employees;
calculating statistical measures for said performance measures over a time period; and
identifying employees having performance measures outside a range of said statistical measures.

32. The computer implemented application of claim 31, wherein analyzing said productivity scores comprises applying linear regression techniques to an expression for said productivity scores of a form $$PS_t(F_{t1}, F_{t2}, \ldots, F_{tK}) = \alpha_t + \sum_{k=1}^{K} \beta_{tk} F_{tk} + \sum_{k=1}^{K} \sum_{k'=1}^{K} \gamma_{tkk'} F_{tk} F_{tk'},$$

where $F_{tk}$ is a measured value for a k task of assignment t,
$PS_t$ is a productivity score for said assignment t as a function of said measured values, $F_{t1}, F_{t2}, \ldots F_{tK}$, and
$\alpha_t$, $\beta_{tk}$ and $\gamma_{tkK'}$ are said productivity parameters.

* * * * *